(12) United States Patent
Yu et al.

(10) Patent No.: US 9,407,704 B2
(45) Date of Patent: Aug. 2, 2016

(54) VIRTUAL POSITION DISPLAY AND INDICATORS

(71) Applicant: Bank of America Corporation, Charlotte, NC (US)

(72) Inventors: Sounil Yu, Reston, VA (US); Dale Binder, Cincinnati, OH (US)

(73) Assignee: Bank of America Corporation, Charlotte, NC (US)

( * ) Notice: Subject to any disclaimer, the term of this patent is extended or adjusted under 35 U.S.C. 154(b) by 148 days.

(21) Appl. No.: 13/965,577

(22) Filed: Aug. 13, 2013

(65) Prior Publication Data

US 2015/0052453 A1    Feb. 19, 2015

(51) Int. Cl.
| | |
|---|---|
| H04L 29/08 | (2006.01) |
| H04L 29/06 | (2006.01) |
| H04W 4/02 | (2009.01) |
| H04N 7/15 | (2006.01) |

(52) U.S. Cl.
CPC ............ *H04L 67/18* (2013.01); *H04L 65/403* (2013.01); *H04L 67/22* (2013.01); *H04W 4/023* (2013.01); *H04L 65/4069* (2013.01); *H04N 7/157* (2013.01)

(58) Field of Classification Search
None
See application file for complete search history.

(56) References Cited

U.S. PATENT DOCUMENTS

| | | | | |
|---|---|---|---|---|
| 6,559,863 | B1 * | 5/2003 | Megiddo | H04L 12/1827 348/14.08 |
| 6,772,195 | B1 * | 8/2004 | Hatlelid et al. | 709/204 |
| 7,840,668 | B1 * | 11/2010 | Sylvain | A63F 13/12 345/419 |
| 8,627,213 | B1 * | 1/2014 | Jouppi et al. | 715/758 |
| 2004/0109023 | A1 * | 6/2004 | Tsuchiya | A63F 13/12 715/758 |
| 2010/0046505 | A1 * | 2/2010 | Saw | H04M 1/2535 370/352 |
| 2012/0246582 | A1 * | 9/2012 | Leacock et al. | 715/753 |
| 2013/0227437 | A1 * | 8/2013 | Brody | H04L 12/1822 715/757 |
| 2014/0115502 | A1 * | 4/2014 | Van Wie | H04L 65/403 715/757 |
| 2014/0368604 | A1 * | 12/2014 | Lalonde et al. | 348/14.08 |

FOREIGN PATENT DOCUMENTS

WO    WO 2012053001 A2 *    4/2012    ............ G06Q 10/10

* cited by examiner

*Primary Examiner* — William Bashore
*Assistant Examiner* — Daniel Parcher
(74) *Attorney, Agent, or Firm* — Banner & Witcoff, Ltd.; Michael A. Springs

(57) ABSTRACT

Systems, methods and apparatuses for identifying and/or displaying an availability or virtual position of a user are provided. In some examples, a virtual position display may be provided and may include a plurality of user indicators. The user indicators may include an availability of the user. In some examples, a user may adjust a position of a user indicator. Adjustment of the user indicator closer to another user indicator may indicate an increased availability status of the user, while adjustment of the indicator away from another user indicator may indicate a decreased availability of the user. In some examples, the user indicator may include a level of activity indication received from one or more sensing devices associated with the user.

14 Claims, 9 Drawing Sheets

VIRTUAL POSITION DISPLAY AND INDICATORS

BACKGROUND

Today's work environment is becoming increasingly untethered. For instance, people are working outside the office, from home, and the like, more and more. This increase in remote working arrangements may make it difficult to collaborate with co-workers because it may be difficult to determine when the coworkers are available. Further, working within an office environment generally simplifies determining when a coworker is available because you may be able to see them in their office, see what they are doing, hear them on the telephone, and the like. The ease and simplicity of ascertaining a person's availability in an office environment is difficult to replicate in the virtual world of remote working arrangements.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for providing an indication of an availability of a user and/or a virtual position of a user. For instance, a virtual position display may be provided and may include a plurality of user indicators. The user indicators may indicate an availability of a user associated with each indicator. In some examples, a user may adjust a position of a user indicator to modify the availability status of the user. For instance, a user may move his or her user indicator closer to another user indicator to indicate that he or she is available and/or willing to collaborate, answer questions, and the like. In another example, a user who wishes to not be disturbed may adjust the position of the user indicator away from another user indicator to indicate he or she is not available.

In some additional aspects, information indicating a level of activity of a user may be received from one or more sensing devices. In some examples, the sensing devices may include a microphone, camera, motion sensor, and the like. The information indicating the level of activity of the user may include near real-time data received from the sensing devices, such as a camera feed or audio feed. In some examples, the data received may be distorted to prevent a user from seeing a clear picture of the user from the camera feed or hear exactly the words being spoken on the audio feed, while still providing an indication that the user is engaged in some activity and is thus not available.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

Figure 1:
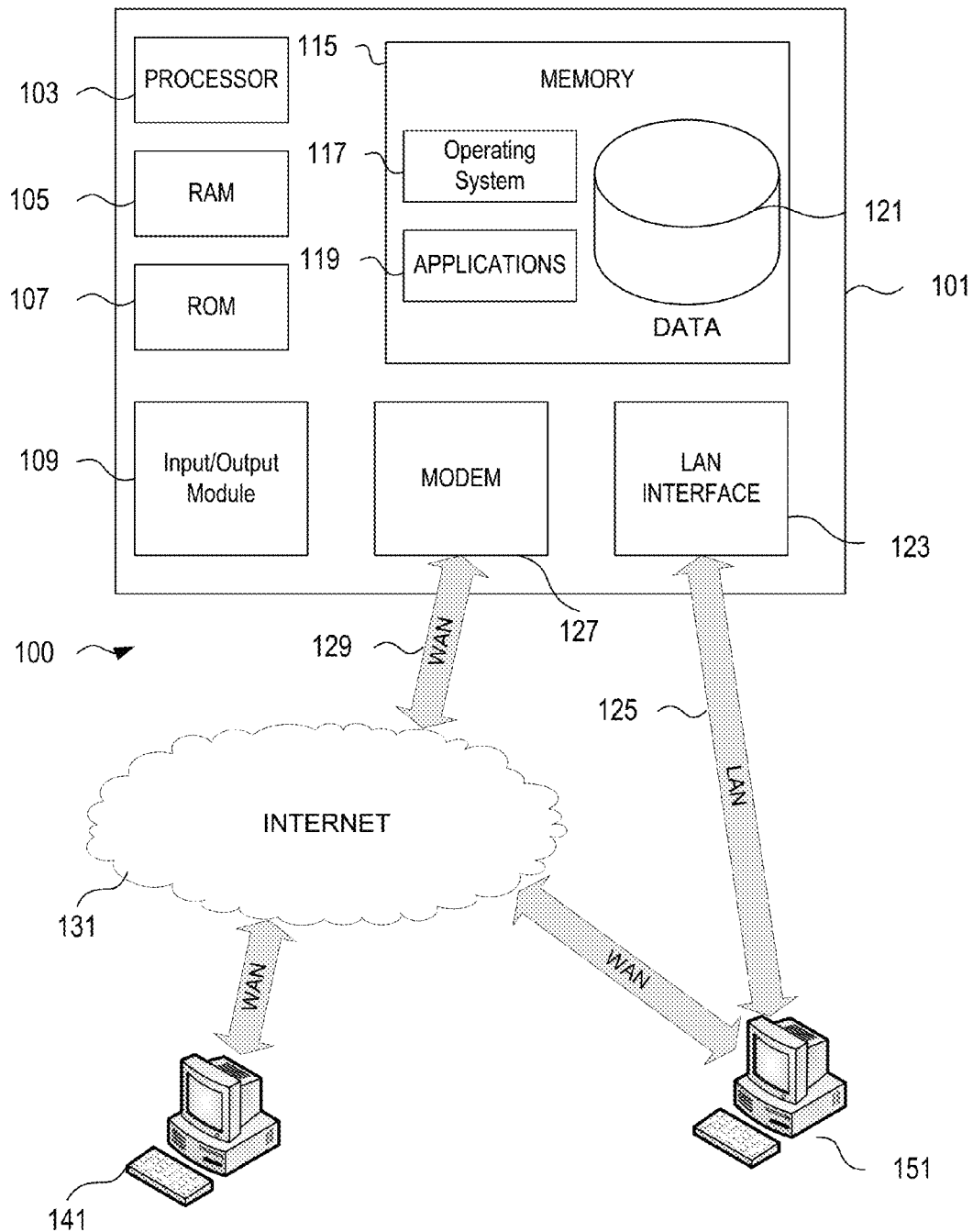
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface 123 or adapter in communications module 109. When used in a WAN networking environment, computing device 101 may include a modem 127 in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
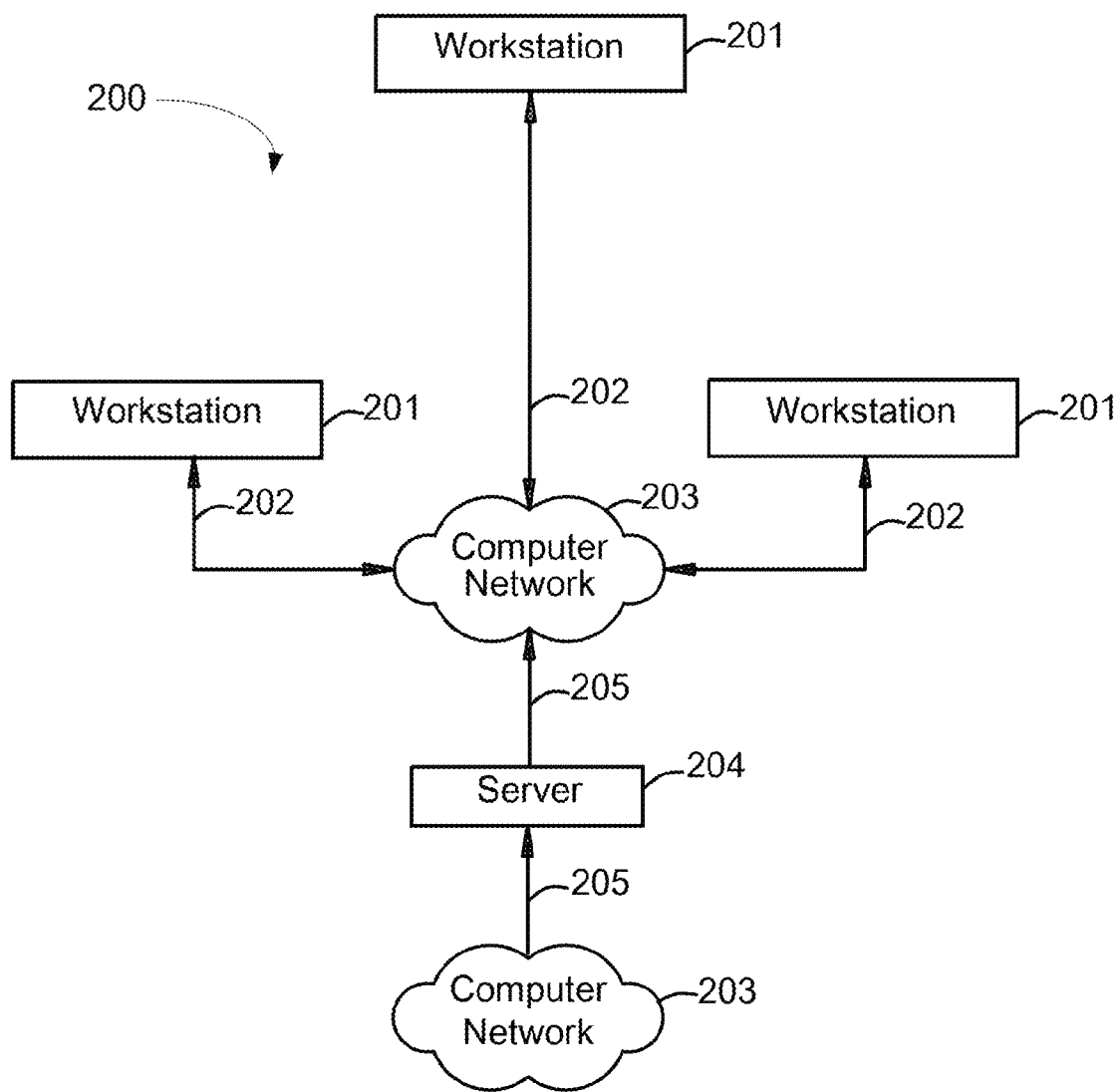
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
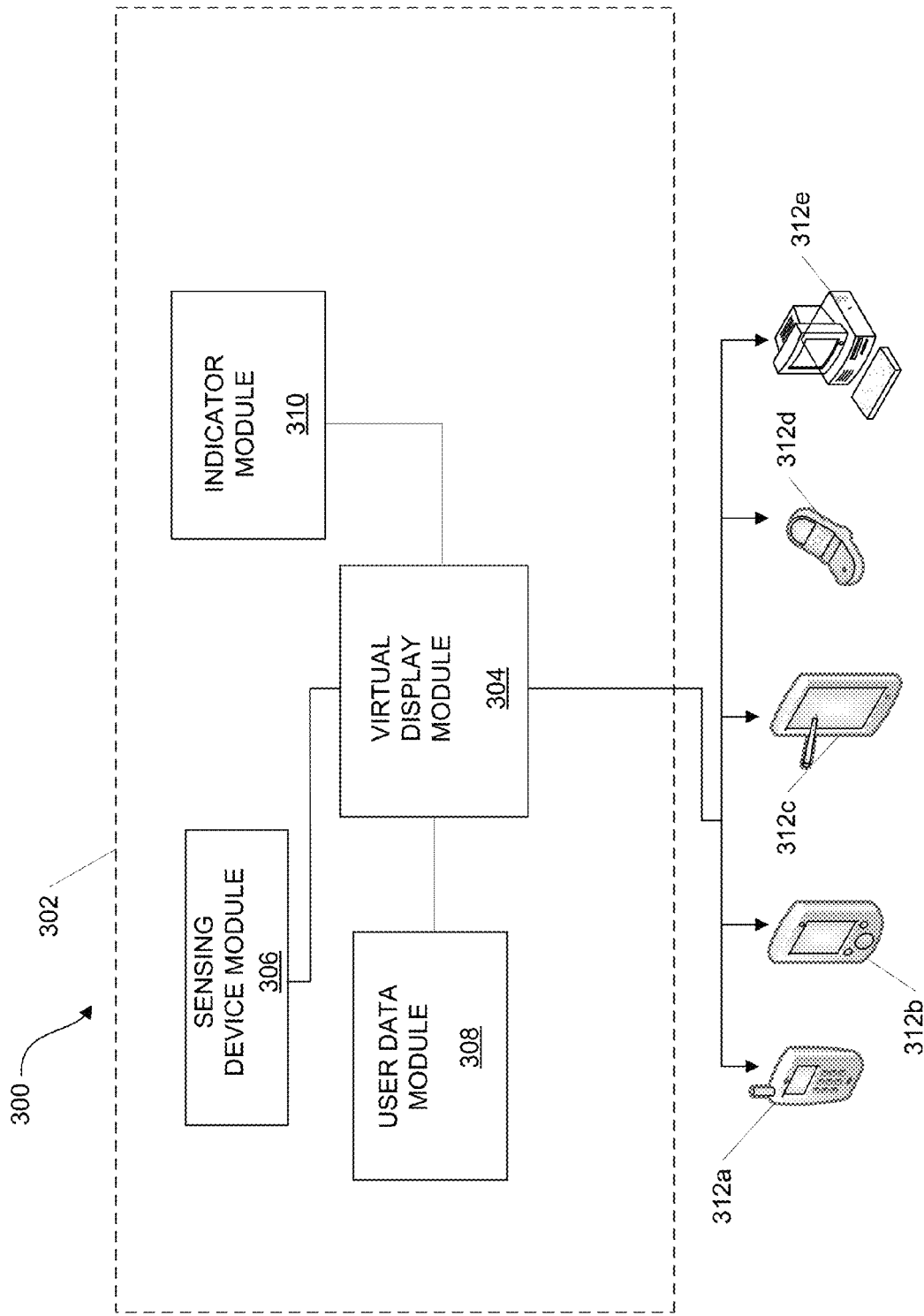
FIG. 3 illustrates an example virtual position display and indicator system according to one or more aspects described herein.

FIG. 3 illustrates one example virtual position display and indication system 300 according to one or more aspects described herein. In some examples, the virtual position display and indication system 300 may be part of, internal to or associated with an entity 302. The entity 302 may be a corporation, university, government entity, and the like. In some examples, the entity 302 may be a financial institution, such as a bank. Although various aspects of the disclosure may be described in the context of a financial institution, nothing in the disclosure shall be construed as limiting the virtual position display and indication system to use within a financial institution. Rather, the system may be implemented by various other types of entities.

The virtual position display and indication system 300 may include one or more modules that may include hardware and/or software configured to perform various functions within the system 300. For instance, the system, 300 may include a virtual display module 304. The virtual display module 304 may receive data from various other modules, as will be discussed more fully below, in order to generate and/or communicate a virtual position display indicating a virtual position of one or more users of the system 300 and/or an availability of the one or more users of the system 300.

The virtual position display and indication system 300 may further include a user data module 308. The user data module 308 may store data associated with one or more users of the system. For instance, the user data module 308 may store information such as name or other unique identifier associated with the system, identifying information associated with one or more computing devices of the user (e.g., unique identifying data for the user's laptop or handheld device, cell phone or smartphone, and the like). In some arrangements, the user data module 308 may also store data associated with one or more typical physical location(s) of a user. For instance, the user data module 308 may store information identifying a location of a user's office within a building or complex.

The virtual position display and indication system 300 may further include a sensing device module 306. The sensing device module 306 may be part of, connected to, or in communication with (such as via a network) one or more sensing devices. The one or more sensing devices may include cameras, motion sensors, audio sensors or microphones, and the like. In some examples, one or more sensing devices may be positioned or located in a working location of a user (e.g., in the user's office, home office, and the like) or within a computing device of a user (e.g., a laptop, smartphone, and the like. For instance, a user may have a web camera or other camera device connected to or integrated with his or her computing device, such as a laptop or handheld device. Additionally or alternatively, camera applications may be used on smartphones, desktop computing devices, and the like. In other arrangements, the sensing device may be a motion detector configured to detect an amount of motion associated with a user. For instance, the user's office may include a motion sensor to detect an amount of movement within the office. The amount of movement may indicate a level of availability of the user (e.g., if the user is relatively still, he or she may be listening to a conference call but not actively participating and thus may be available to a limited extent to interact with others). In still other arrangements, the sensing device may be an audio sensor or microphone that may be arranged within an office of the user or may be associated with a computing device of the user. The microphone may be configured to detect audio (e.g., when the user is on the phone or has someone in his or her office).

Signals from the one or more sensing devices may be transmitted to the sensing device module 306. The sensing device module may, in some instances, modify the signals received, and may transmit or otherwise permit the virtual display module 304 to access the signals received (or modified signals) from the one or more sensing devices to provide location information, activity level information, availability, and the like, of a user. Various other examples of the use of sensing devices within the system will be described more fully below.

The virtual position display and indication system 300 may further include an indicator module 310. The indicator module 310 may generate or configure one or more user indicators associated with a user. In some examples, the indicator module 310 may be part of, connected to, or in communication with the sensing device module 306 and/or the virtual display module 304. The indicator module 310 may receive data associated with one or more sensing devices and/or one or more users and may generate one or more user indicators associated with the user that identify an activity level, availability, and the like. The indicators may then be displayed or provided to one or more users of the system 300 via the virtual display module 304.

Accordingly, data from the user data module 308, sensing device module 306 and indicator module 310 may be received by the virtual display module 304 in order to generate and/or communicate a virtual position display indicating a virtual location and/or availability of one or more users. The virtual position display may be accessed, received, and/or displayed by one or more computing device. For instance, the virtual position display or interface may be accessed by a user via a smartphone 312*a*, personal digital assistant 312*b*, tablet computer 312*c*, cell phone 312*d* or terminal 312*e*. Various other types of computing devices (e.g., laptop computers) may be used to access the virtual position display as well.

The interface or virtual position display generated by the virtual display module 304 and accessed via the one or more computing devices 312*a*-312*e* may, as discussed above, include one or more user indicators. In some examples, each user indicator may be associated with a user (e.g., a user of the system, a user within a building or office, a user within a group of employees, and the like). The user indicator may include a unique identifier to indicate the user associated with a particular identifier. For instance, the indicator may include a last name of the user, a first initial and last name of the user, a full name of the user, and the like. Various other unique identifiers may be used (e.g., employee number, username, and the like).

As will be discussed more fully below, the user indicators may, in some arrangements, be configured to provide additional information about the availability and/or activity level of a user. For instance, a user indicator may be shown proximal one or more other indicators in order to indicate a level of availability and willingness to work with the users associated with the other indicators within a predetermined threshold proximity. Alternatively, the indicator may be shown a greater distance from one or more other user indicators to indicate that the user is busy or unavailable at that time. In some arrangements, a user may determine or adjust the position of the user indicator associated with the user in order to modify the provided indication of availability. These and various other arrangements will be discussed more fully below.

In still other arrangements, a user indicator shown on the virtual position display may include a live feed from a sensing device, such as a camera, audio sensor, and the like, and may display or provide the live feed via the virtual position display. In some examples, the live feed may be distorted such that a clear image is not shown but enough of the image is shown to indicate how active or busy the user is at that moment. In some examples, rather than (or in addition to) displaying the live feed or distorted live feed, a proxy may be displayed to users of the system. For instance, an image, photo, avatar, etc. of the user may be displayed to other users upon the camera detecting the presence of the user (in lieu of or in addition to the live feed or distorted live feed). Thus, a user viewing the virtual position display may be able to quickly ascertain whether one or more users are busy and therefore unavailable or whether the one or more users might be available to collaborate, answer questions, and the like.

In some arrangements, the sensing device may be a microphone and the live audio feed may be presented via the virtual display. Similar to the video feed arrangement, the audio feed may be distorted such that a user viewing the virtual display and hearing the audio feed cannot understand the words being said but may hear enough audio to understand that the user is otherwise engaged in conversation at that time. Similar to the arrangements discussed above, rather than (or in addition to) providing the audio feed or distorted audio feed, a proxy audio feed may be provided upon detecting audio from the sensing device.

These and various other arrangements will be discussed more fully below.

Figure 4:
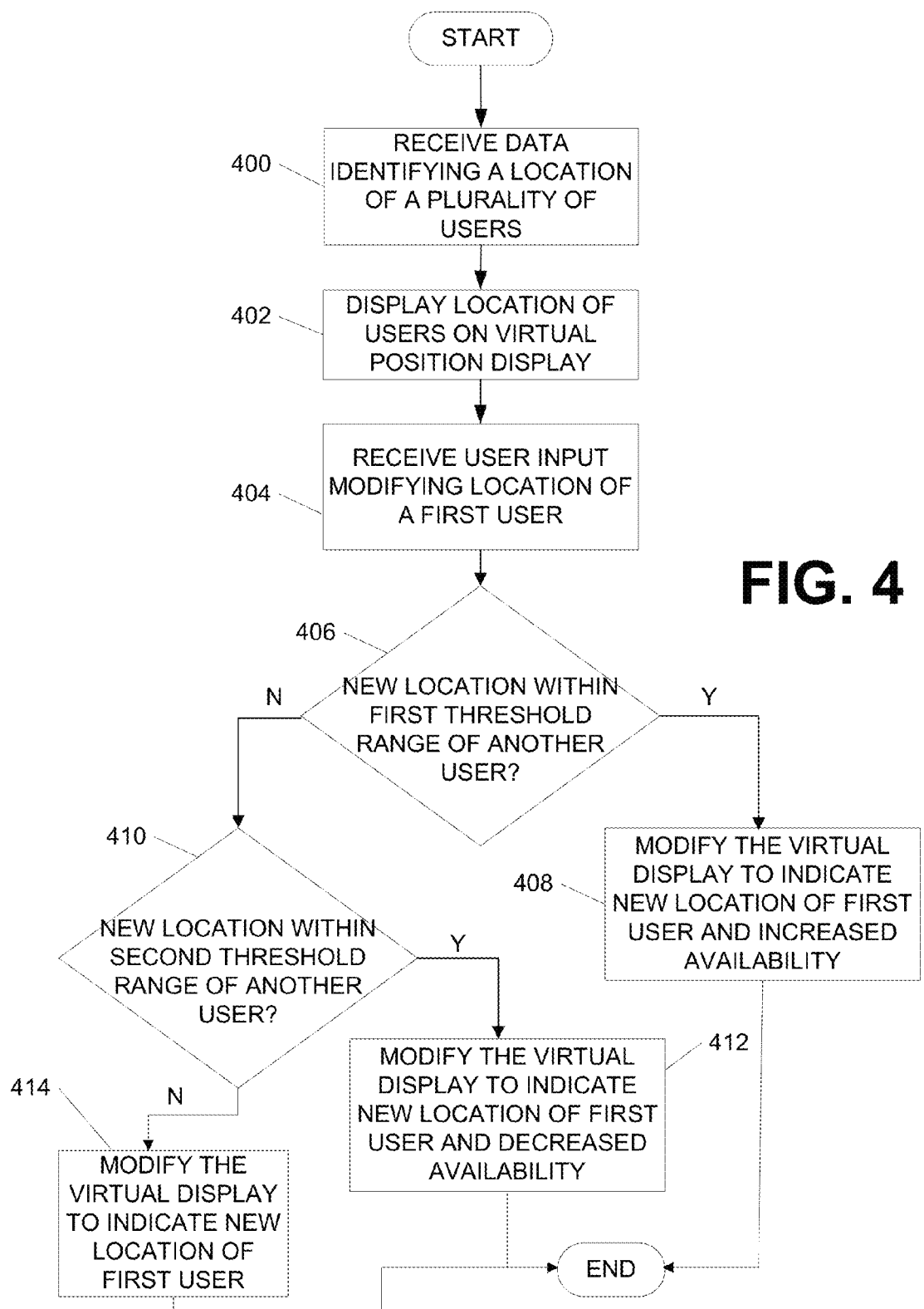
FIG. 4 is an example method of providing a virtual position display and modifying the display to indicate availability according to one or more aspects described herein.

FIG. 4 illustrates one example method of modifying a virtual position display to provide information regarding an availability of a user. In step 400, data is received identifying a location of a plurality of users. For instance, the data received may indicate that a user is in his or her office. In some examples, the data may also identify an availability of the user. For instance, the system may include a default status of "available." The system may have additional default settings, such as default location of a user, default proximity between users, and the like. In some arrangements, each user, upon start-up of a computing device, or upon accessing the virtual position display and indication system, will have a default location on the display that may be a schematic representation of the user within his or her office. In step 402, a location of the plurality of users is shown on a virtual position display. As discussed above, each user may be associated with a user indicator identifying a position or location and/or an availability of the user.

Figure 5A:
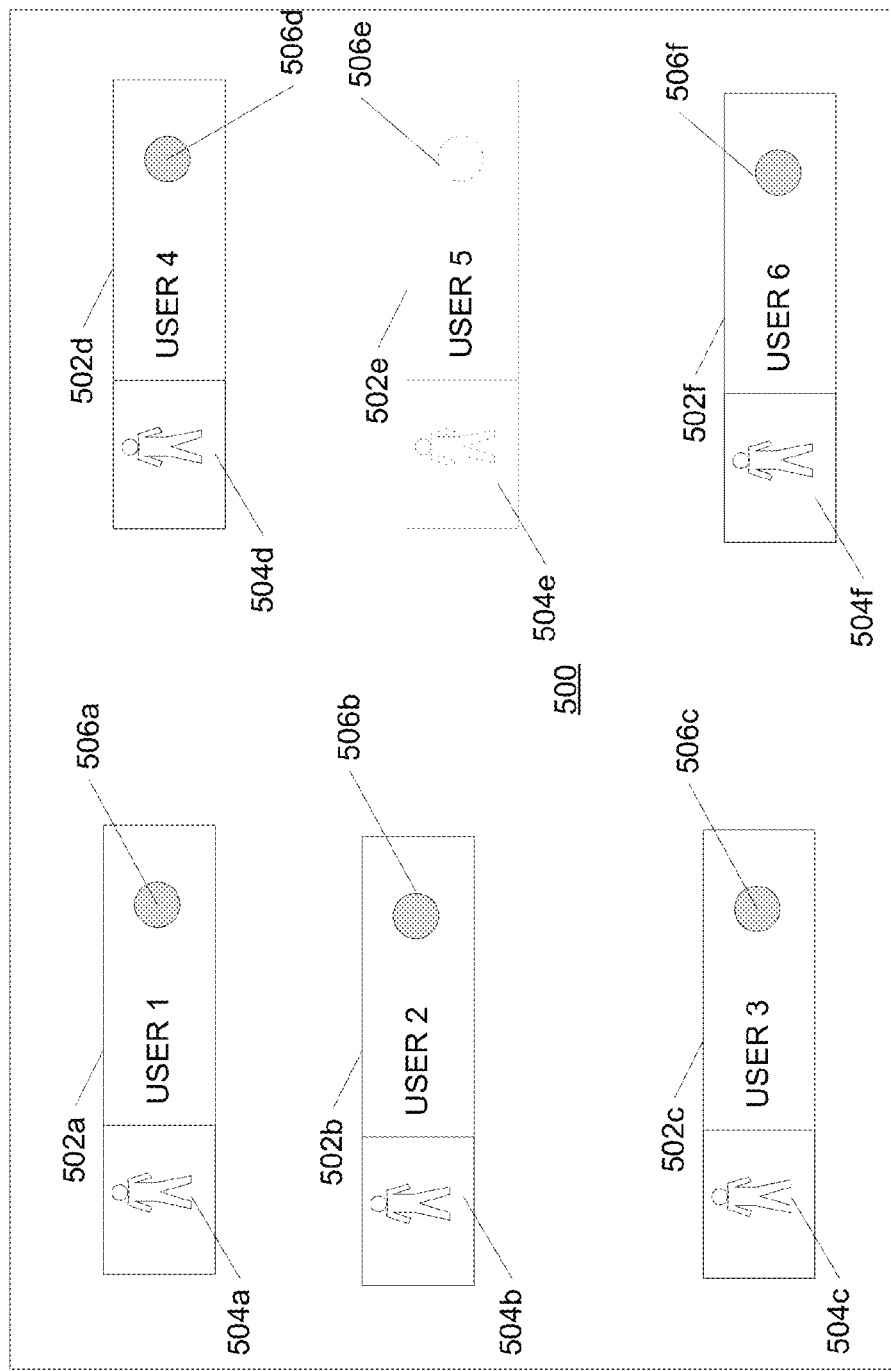
FIGS. 5A-5C illustrate example virtual position displays according to one or more aspects described herein.

For instance, FIG. 5A illustrates one example virtual position display according to one or more aspects described herein. The virtual position display 500 may be a schematic representation of an overhead view of an office, portion of an office, building, and the like. In some arrangements, the virtual position display may be in the form of an office floor plan, building floor plan, or the like in which a user may be shown within his or her office, even if the user is working from another location. The indication of the user in his or her office may be an indication that the user is generally available (e.g., similar to seeing a co-worker in his or her office). FIG. 5A includes user indicators 502a-502f, each of which are associated with one of six different users, User 1-User 6. Although six different users are shown, more or fewer users may be associated with the system and/or displayed on the virtual position display. Each user indicator 502a-502f may include an activity display region 504a-504f. Each user indicator 502a-502f may also include a status indicator 506a-506f. The users shown in FIG. 5A may be a plurality of users working in the same department, division, business unit, and the like. Additionally or alternatively, the users may be a group of users working on a project together and, as such, it may be advantageous to understand the availability of each group member. In some examples, the users displayed on the virtual position display 500 may be automatically grouped together or selected for display together (e.g., such as based on department divisions, and the like). Additionally or alternatively, the users displayed may be selected, such as by an administrator, group leader, project manager, and the like, to provide a custom display showing the location and availability of each user as desired.

FIG. 5A illustrates one example default arrangement indicating a position of the users via the user indicators 502a-502f. In the arrangement shown, each user indicator 502a-502f is positioned essentially in a location separate from the other user indicators 502a-502f. In some examples, each user indicator 502a-502f may be approximately equidistant from each of the other user indicators 502a-502f. Based on this default position, the system may identify each user with a status indicating they are "available." For instance, the status indicator 506a-506f of each user indicator 502a-502f may be the same color to indicate that each user has the same status. In some examples, the shade of the color used may vary to indicate a level of availability. For instance, a light gray color, such as shown in status indicator 506a, 506b, 506c, 506d and 506f, may indicate a high level of availability for a user. Darker shades of gray may indicate the user is busy or unavailable. The varying color arrangements will be described more fully below.

The activity display region 504a-504f of each user indicator 502a-502f may include an image (such as a photo, avatar, and the like) of the user. Additionally or alternatively, the activity display region may provide a live video feed of the user that may be received from one or more sensing devices, such as a web camera.

As shown in FIG. 5A, User 5 is shown as grayed-out. In some examples, this may indicate that the user has not logged in to a computing device yet. Upon login, the user may invoke an option and User 5 will appear similar to the other users on the display 500 (as shown in FIGS. 5B and 5C).

With further reference to FIG. 4, in step 404 user input is received modifying a location of a user. For example, a user may desire to indicate to other users viewing the virtual position display that he is available and willing to collaborate with others. Accordingly, the user may modify the location of the user indicator associated with the user (e.g., move the user indicator from a first position to a second position). In some examples, the second position may be closer to one or more other user indicators to indicate that the user is available and willing to collaborate with the one or more users associated with the one or more other user indicators. The user input may include, in some examples, clicking and dragging the indicator associated with the user to a position closer to another user.

Figure 5B:
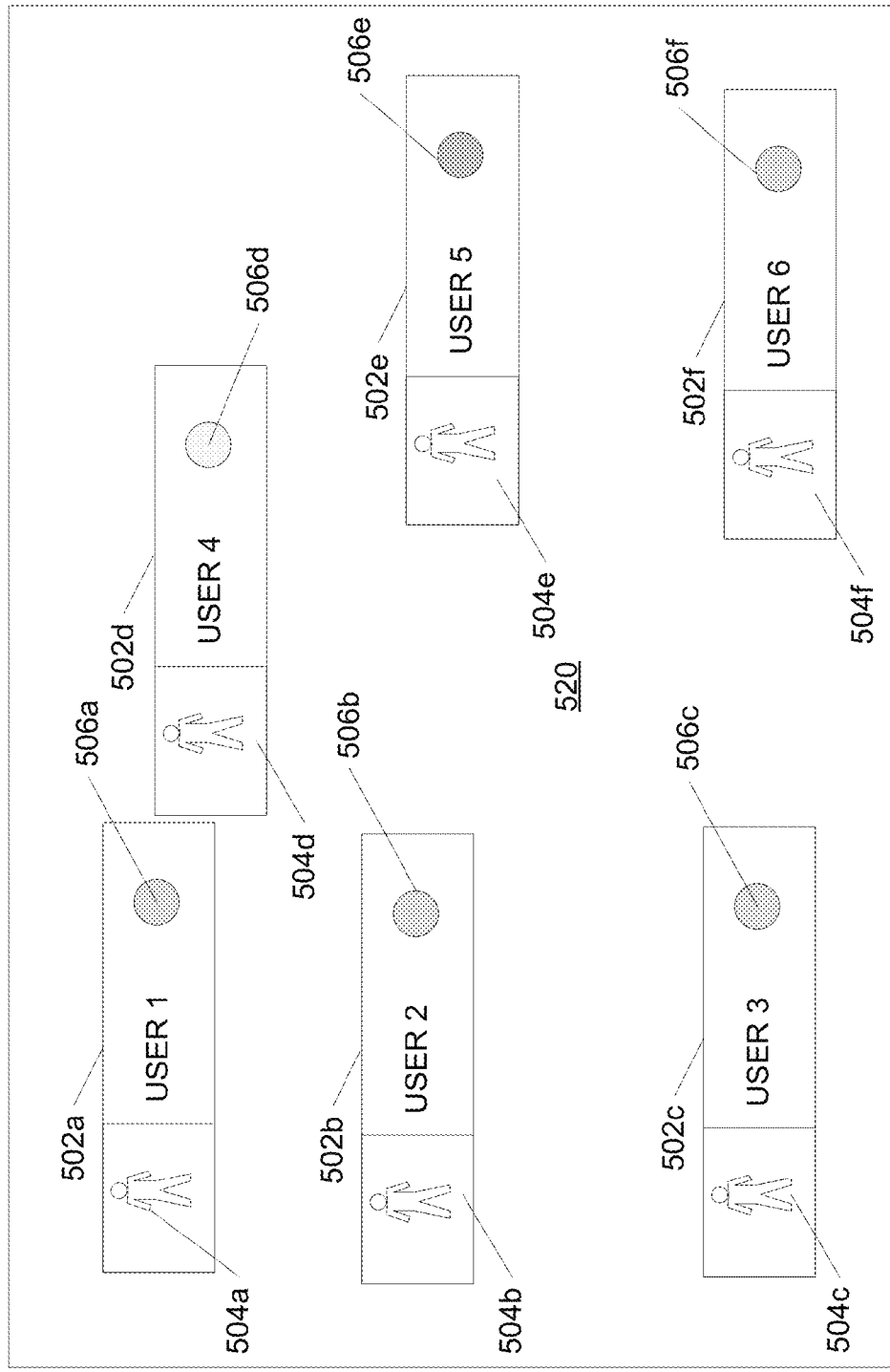
Figure 5C:
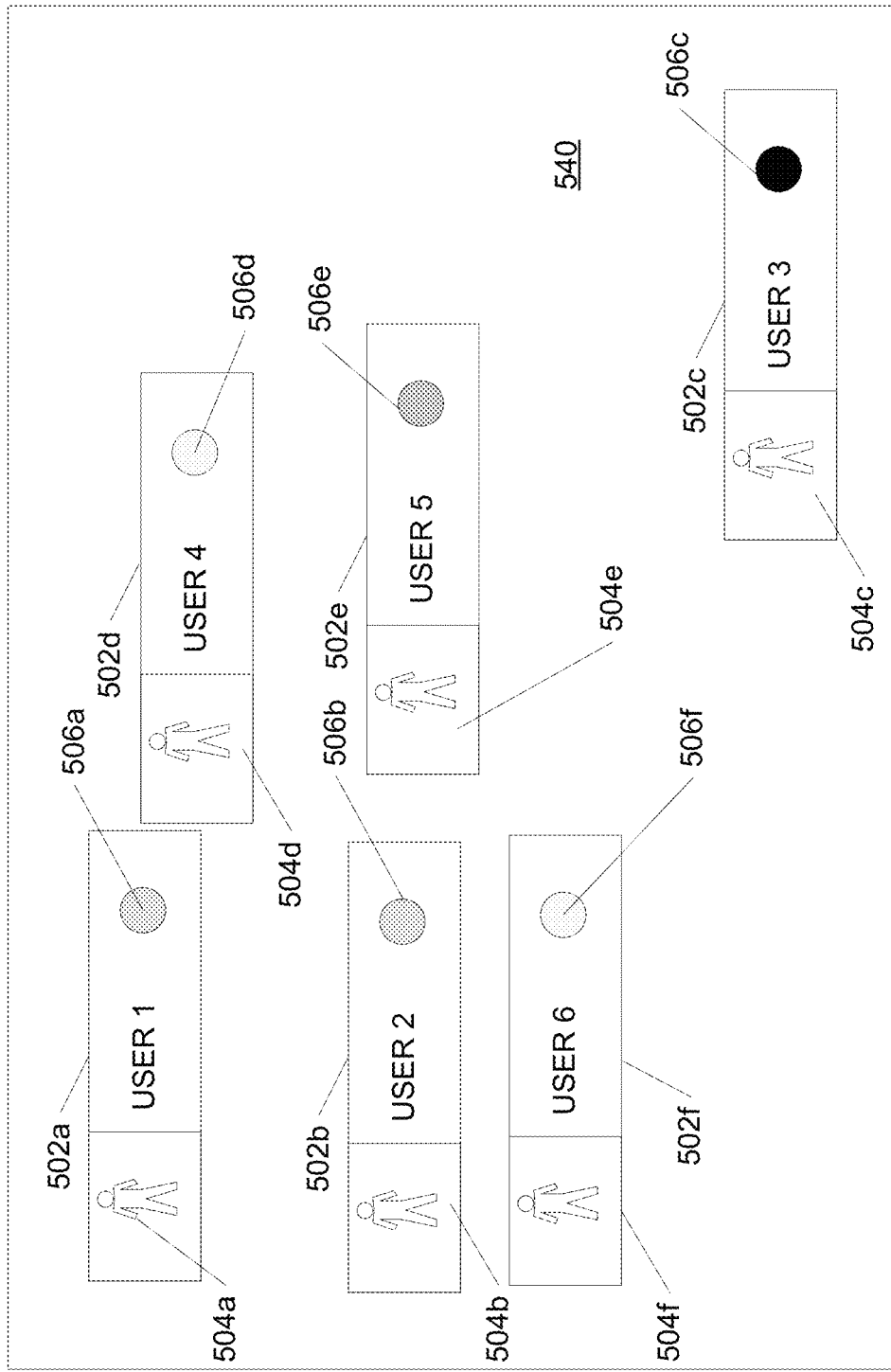

For example, FIG. 5B illustrates a virtual position display 520 similar to the display 500 in FIG. 5A but with the indicator 502d associated with User 4 in closer proximity to indicator 502a associated with User 1 and indicator 502b associated with User 2.

In step 406, a determination may be made as to whether the new location or second location is within a predefined first threshold of an indicator associated with another user. For instance, if the user (in this example, User 4) has moved his or her indicator closer to the other indicators, then User 4's indicator may be within the predefined first threshold. Accordingly, in step 408, the system may modify the virtual position display to indicate the new location of the user and may also update the status indicator associated with the user to indicate an increase in availability. For instance, the status indicator may include a lighter shade of gray (such as status indicator 506d in FIG. 5B) which may indicate an increased availability and/or willingness to collaborate, interact, and the like. In other arrangements, the color may be a deeper shade of green to indicate an increased availability. Various other color arrangements may be used. For example, one or more shades of a same or similar color may be used to indicate different levels of availability.

If, in step 406, the new location is not within the predefined first threshold, a determination may be made as to whether the new location is within a predefined second threshold in step 410. The second threshold may be different from the first threshold and may, in some examples, indicate that a user has moved a greater distance from one or more other users. For instance, FIG. 5C illustrates another virtual position display 540. Virtual position display 540 shows user indicators associated with User 1 502a, User 2 502b, User 4 502d, User 5, 502e and User 6 502f in close proximity to each other. However, the user indicator associated with User 3 502c has been moved to a position a farther from the other indicators. This may indicate that User 3 is unavailable or busy.

If the new location is within the predefined second threshold in step 410, then, in step 412 the virtual position display may be modified to illustrate the new position of the user indicator and a decreased availability of the user. For instance, the status indicator 506c associated with User 3 is, in the example of FIG. 5C, a darker shade of gray or black to indicate a decreased availability. In some examples, the status indicator may include a lighter shade of green to indicate reduced availability or a shade of amber or red to indicate reduced availability.

If, in step 410, the new location is not within the predefined second threshold, then, in step 414, the virtual position display may be modified to indicate the new position but no change in status may be indicated. For example, the user indicator may be moved to a new position but the status indicator associated with that indicator may remain a same shade or color as it was in the previous location or position.

Figure 6:
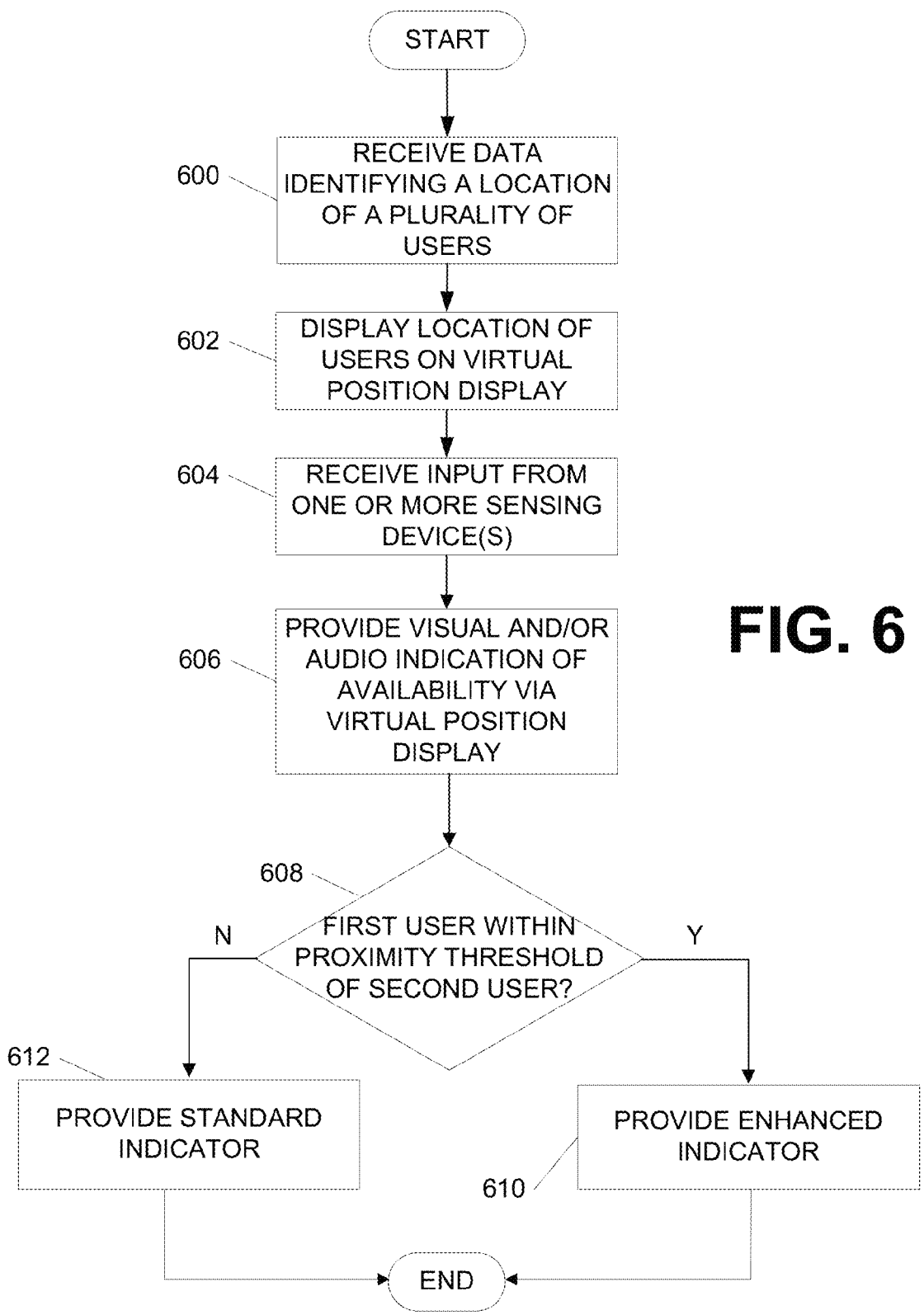
FIG. 6 is an example method of identifying position and availability of one or more users on a virtual position display according to one or more aspects described herein.

FIG. 6 illustrates another example method of identifying position and availability of one or more users on a virtual position display according to one or more aspects described herein. In step 600, data identifying a location of a plurality of users is received. In step 602, the location of the plurality of users is displayed on a virtual position display. Similar to the arrangements discussed above, each user may be represented by an indicator, such as indicators 502*a*-502*f* in FIGS. 5A-5C.

In step 604, input from one or more sensing devices may be received. As discussed above, one or more sensing devices, such as cameras, motion sensors, microphones, and the like, may be part of, connected to or in communication with the system, such as virtual position display and indication system 300 in FIG. 3. The input received from the one or more sensing devices may be used to determine a level of activity and/or availability associated with the user.

For instance, a signal from a motion sensor may indicate that the user being detected is moving more than, for instance, a baseline level of movement. In some examples, the baseline level of movement may be determined over a predefined period of time (e.g., monitoring the user for a day, a week, a month, and the like) and may be stored, for instance, in the user data module (308 in FIG. 3). Accordingly, that increased movement may indicate that the user is busy and, as such, the status indicator associated with the user may show that he or she is unavailable. In some examples, the reduced availability indication may be in the form of a different color or different shade of color associated with more availability, as discussed above.

In another example, a microphone or other audio sensor may detect audio from a user. In some examples, the detected audio may be greater than a baseline detected audio which may be determined and stored similar to the arrangement described above. In other arrangements, any detected audio may prompt the system as discussed below. The system may then determine that, based on the audio being received from the user, the user is either on the phone or otherwise engaged at that time. Accordingly, the status indicator associated with that user may indicate that he or she is unavailable. Alternatively, if no audio is received from the user, that may indicate that he or she is available and the status indicator associated with the user's indicator may show the user as available (or somewhere within a range of "available" indicators).

In yet another example, a camera signal may be received indicating that the user is in his or her office, at his or her computing device, and the like. Accordingly, the system may identify the user as available based on his presence detected via the camera.

In step 606, a virtual position display is generated and a visual and/or audio indication of the position and/or availability of one or more users is provided via the display. For instance, as discussed above, each user may be represented by an user indicator (502*a*-502*f* in FIGS. 5A and 5B). The position of the user indicator itself may indicate a location of the user (e.g., within the office, working from home, and the like) and/or a relative availability of the user (e.g., user indicator positioned closer to other user indicators to indicate availability). Further, the user indicator may include a visual indication of the status or availability of the user. For instance, as discussed above, status indicator 506*a*-506*f* may be used to identify an availability of the user. The color or shade of the status indicator 506*a*-506*f* may indicate a level of availability. The availability indicated may be automatically determined by the system or may be manually provided by the user. In some examples, as discussed above, the level of availability may be determined (e.g., automatically) based on a proximity of the indicator to one or more other indicators.

The indicators 502*a*-502*f* may include activity display region 504*a*-504*f*. The activity display region 504*a*-504*f* may provide a further indication of the level of availability or level of activity of the user. For instance, the activity display region 504*a*-504*f* may include a live video feed from a camera associated with the user associated with that user indicator. In some examples, the video feed may include a delay due to editing, transmission time, and the like. However, the feed may generally be a real-time or near real-time representation of the image being viewed by a camera associated with that user.

In some arrangements, the live video feed provided in the activity display region may be distorted in order to prevent others from clearly viewing exactly what the user is doing. For instance, the image provided may be pixelated, grayed-out, blurred, and the like, such that users cannot clearly see the user in the camera image but simply the outline or other representation of the user providing enough information to understand that the user is working at the computing device or is in a position to be viewed by the camera. In other examples, as discussed above, rather than (or in addition to) displaying the live feed or distorted live feed, an image, photo, avatar, or the like, of the user may be presented. The image may be presented upon detection of the user by the camera or other sensing device and may be used, similar to the live feed or distorted live feed, to indicate an activity level, availability, and the like of the user.

Figure 7:
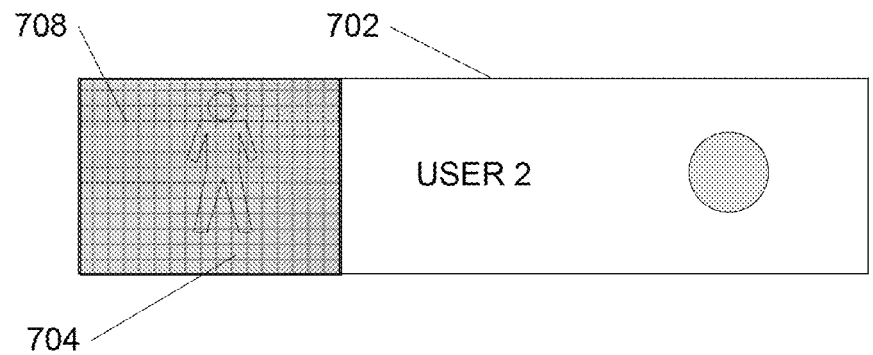
FIG. 7 illustrates one example user indicator and associated visual indication of availability according to one or more aspects described herein.

FIG. 7 illustrates one example indicator 702 having a distorted activity display region 704. Activity display region 704 may include the real-time or near real-time camera feed of the user (as indicated by the person icon within the region 704). However, a clear image of the person icon is not shown because the image provided is distorted by film 708. The film 708 represents the variety of distortion techniques discussed above and may prevent other users from clearly seeing the user (e.g., User 2) but will provide enough of a representation of the user for other users to understand that he or she is working at his or her computing device and thus, is likely available. In some arrangements, the distortion of the image may be similar to looking through frosted glass. That is, the outline or representation of a person can be viewed through the frosted glass but individuals cannot obtain a clear image of the user through the frosted glass. Additionally or alternatively, the activity display region 704 may include a predetermined image of the user, such as a photograph, avatar, and the like, as discussed above.

Figure 8:
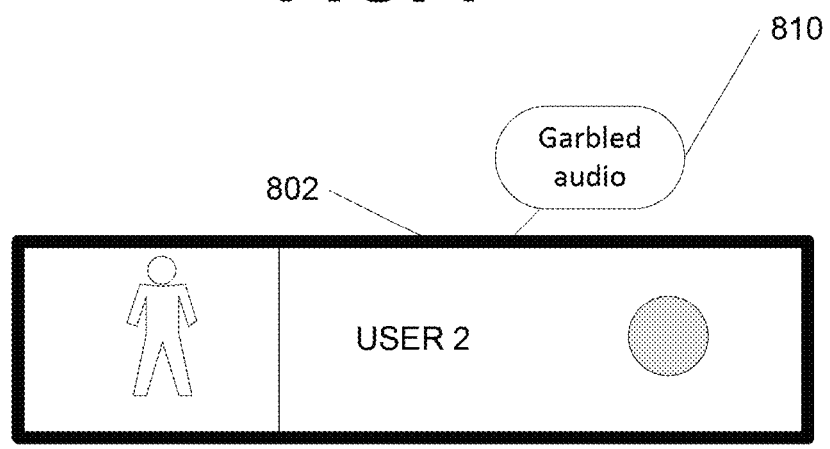
FIG. 8 illustrates an example user indicator that provides an audio indication of availability according to one or more aspects described herein.

FIG. 8 illustrates another example indicator 802 providing an audio indication of the availability of the user. The indicator 802 may be presented on a virtual position display similar to the arrangements discussed above. In some examples, selection of the indicator 802 (such as by clicking or double clicking on the indicator 802) may enable audio indication of the availability of the user. For instance, indicator 802 has a thick, black border to indicate it has been selected. Upon that selection, audio feed received from a microphone or other audio sensing device associated with the user (e.g., User 2) may be heard via the virtual position display (as indicated by element 810). Similar to the "frosted glass" arrangement discussed above, the audio feed may include the actual audio being detected by the microphone or audio sensor (e.g., the actual conversation) but may be distorted such that a user would not be able to understand the words being spoken by the user but could merely recognize that the user is speaking to someone (either on the telephone, video chat, in his or her office, and the like) and thus is likely not available at that time. The audio feed may be in real-time or near real-time, similar to the camera arrangement discussed above. Thus, one or more users viewing the virtual position display may be able to quickly determine whether a user is engaged with someone else at a particular time by activating the audio indicator. If there is silence or near silence, the user is likely to be available. However, if conversation is heard, the user is likely to be unavailable. Similar to the arrangements described above, rather than (or in addition to) providing the audio feed or distorted audio feed, a proxy audio feed may be provided.

With further reference to FIG. 6, in step 608 a determination is made as to whether a first user indicator is within a predetermined proximity or threshold proximity of a second user indicator. That is, whether the two (or more) indicators are located within a certain proximity on the virtual position display. If so, enhanced indicators may be provided in step 610. For instance, a close proximity (e.g., within the threshold) between two or more indicators may mean that the users associated with those indicators work in the same group, on the same project or in another such collaborative work arrangement. Accordingly, you may be more likely to be interested in the availability of those people. Thus, an enhanced indicator may be provided. For instance, in some examples, the volume of the audio indication provided may be increased for those within the predefined proximity. In another example, the enhanced indicator may include less distortion in a video feed indicator in order to better understand what the user is doing at that particular moment. In this example, some distortion may still be present but not as much distortion as show to those outside the predefined proximity.

If, in step 608, the first user is not within the predefined proximity of the second user, standard indicators will be provided in step 612, as discussed above.

In some examples, input from multiple sensing devices may be received and may be combined to determine the most likely availability status for a user. For instance, a camera signal may indicate that the user is in his or her office but is relatively still. This signal alone may indicate that the user is available or accessible. However, in this example, an audio signal may also be received. The audio signal may indicate a conversation is taking place, such as a telephone conversation. Accordingly, that signal alone would indicate that the user is busy or unavailable. When the multiple signals cause a conflict in determining the availability, a predetermined priority may be used to determine which signal should be used to identify the availability. For instance, if conversation is taking place, it is very likely that the user is busy or unavailable. Accordingly, the audio signal may be given priority when multiple signals are received. In another example, the camera feed provides a real-time or near real-time image of the user and is thus a generally reliable indicator of availability. Accordingly, the camera feed may take priority over, for instance, a motion sensor signal, in identifying availability.

The virtual position display and indication system may, in some examples, start-up upon a user starting up one or more of his or her computing devices or upon login to one or more computing devices. In this arrangement, the system may run in the background such that it is not always visible to a user. However, the user may select the system to view the display and thus determine an availability of one or more users. Accordingly, the user availability can be viewed when it is desired or convenient for one or more users but the system and/or display will not be a distraction to a user.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. An apparatus, comprising:
at least one processor; and
a memory storing computer-readable instructions that, when executed by the at least one processor, cause the apparatus to:
receive data identifying a plurality of users and a location within a building of each user of the plurality of users;
generate a virtual position display including a plurality of user indicators and displaying the location of each user of the plurality of users, each user indicator of the plurality of user indicators being associated with a user of the plurality of users;
communicate the virtual position display including the plurality of user indicators to the plurality of users including at least a first user and a second user, the plurality of user indicators including at least a first user indicator associated with the first user and a second user indicator associated with the second user;
determine, whether a proximity between the first user indicator and the second user indicator on the virtual position display is at or within a predetermined first threshold distance;
responsive to determining that the proximity is at or within the predetermined first threshold distance, provide, on the virtual position display, an indication of a first availability of one of the first user and the second user;

responsive to determining that the proximity is not at or within the predetermined first threshold distance, determine whether a proximity between the first user indicator and the second user indicator on the virtual position display is at or within a predetermined second threshold distance different from the first threshold distance;

responsive to determining that the proximity is at or within the predetermined second threshold distance, provide, on the virtual position display, an indication of a second availability of one of the first user and the second user, the second availability being different from the first availability;

responsive to determining that the proximity is not at or within the predetermined first threshold distance or the predetermined second threshold distance, provide, on the virtual position display, an indication of a third availability of one of the first user and the second user, the third availability being different from the first availability and the second availability, wherein a position of one or more of the plurality of user indicators may be adjusted to adjust the identified first availability;

receive, from a motion sensing device in a location of the first user, motion information indicating a level of activity of the first user;

receive, from a camera associated with the first user, image information indicating the level of activity of the first user;

receive, from a noise sensing device, audio information indicating the level of activity of the first user, the audio information including an audio signal;

determine whether a conflict exists between the motion information, image information, and audio information;

responsive to determining that the conflict exists, prioritize one of the motion information, image information, and audio information based on a predetermined priority; and provide, to the plurality of users including the second user via the virtual position display, an indication of the level of activity of the first user based on the predetermined priority of the motion information, image information and audio information.

2. The apparatus of claim 1, wherein the image from the camera is a near real-time image and wherein the indication of the level of activity of the first user includes a distorted version of the image from the camera.

3. The apparatus of claim 1, wherein the audio information indicating the level of activity includes a near real-time audio feed of sound detected by the noise sensing device, the sound detected by the noise sensing device being associated with the first user.

4. The apparatus of claim 3, wherein the indication of the level of activity of the first user includes a distorted version of the near real-time audio feed of sound detected by the noise sensing device.

5. The apparatus of claim 1, further including instructions that, when executed, cause the apparatus to:

responsive to determining that the proximity is at or within the predetermined first threshold distance, modifying at least one of the first user indicator and the second user indicator to be an enhanced user indicator, the enhanced user indicator including a volume of audio indication higher than the first user indicator and the second user indicator.

6. A method, comprising:

receiving, by a virtual position display system, data identifying a plurality of users and a location within a building of each user of the plurality of users;

generating, by the virtual position display system, a virtual position display including a plurality of user indicators and displaying the location of each user of the plurality of users, each user indicator of the plurality of user indicators being associated with a user of the plurality of users;

communicating, by the virtual position display system, the virtual position display including the plurality of user indicators to the plurality of users including at least a first user and a second user, the plurality of user indicators including at least a first user indicator associated with the first user and a second user indicator associated with the second user;

determining, by the virtual position display system, whether a proximity between the first user indicator and the second user indicator on the virtual position display is at or within a predetermined first threshold distance;

responsive to determining that the proximity is at or within the predetermined first threshold distance, providing, on the virtual position display, an indication of a first availability of one of the first user and the second user;

responsive to determining that the proximity is not at or within the predetermined first threshold, determining whether a proximity between the first user indicator and the second user indicator on the virtual position display is at or within a predetermined second threshold distance different from the first threshold distance;

responsive to determining that the proximity is at or within the predetermined second threshold distance, providing, on the virtual position display, an indication of a second availability of one of the first user and the second user, the second availability being different from the first availability;

responsive to determining that the proximity is not at or within the predetermined first threshold distance or the predetermined second threshold distance, providing, on the virtual position display, an indication of a third availability of one of the first user and the second user, the third availability being different from the first availability and the second availability, wherein a position of one or more of the plurality of user indicators may be adjusted to adjust the identified first availability;

receiving, from a motion sensing device in a location of the first user, motion information indicating a level of activity of the first user;

receive, from a camera associated with the first user, image information indicating the level of activity of the first user;

receive, from a noise sensing device, audio information indicating the level of activity of the first user, the audio information including an audio signal;

determine whether a conflict exists between the motion information, image information, and audio information;

responsive to determining that the conflict exists, prioritize one of the motion information, image information, and audio information based on a predetermined priority; and providing, to the plurality of users including the second user via the virtual position display, an indication of the level of activity of the first user based on the predetermined priority of the motion information, image information and audio information.

7. The method of claim 6, wherein the image from the camera is a near real-time image and wherein providing the indication of the level of activity of the first user includes providing a distorted version of the image from the camera.

8. The method of claim 6, further including:
wherein the audio information indicating the level of activity includes a near real-time audio feed of sound detected by the noise sensing device, the sound detected by the noise sensing device being associated with the first user.

9. The method of claim 8, wherein providing the indication of the level of activity of the first user includes providing a distorted version of the near real-time audio feed of sound detected by the noise sensing device.

10. The method of claim 6, further including:
receiving user input adjusting a position of the first user indicator; and
adjusting the indicated availability of the first user based on the user input adjusting the position of the first user indicator.

11. One or more non-transitory computer-readable media having computer-executable instructions stored thereon that, when executed, cause at least one computing device to:
receive data identifying a plurality of users and a location within a building of each user of the plurality of users;
generate a virtual position display including a plurality of user indicators and displaying the location of each user of the plurality of users, each user indicator of the plurality of user indicators being associated with a user of the plurality of users;
communicate the virtual position display including the plurality of user indicators to the plurality of users including at least a first user and a second user, the plurality of user indicators including at least a first user indicator associated with the first user and a second user indicator associated with the second user;
determine, whether a proximity between the first user indicator and the second user indicator on the virtual position display is at or within a predetermined first threshold distance;
responsive to determining that the proximity is at or within the predetermined first threshold distance, provide, on the virtual position display, an indication of a first availability of one of the first user and the second user;
responsive to determining that the proximity is not at or within the predetermined first threshold, determine whether a proximity between the first user indicator and the second user indicator on the virtual position display is at or within a predetermined second threshold distance different from the first threshold distance;
responsive to determining that the proximity is at or within the predetermined second threshold distance, provide, on the virtual position display, an indication of a second availability of one of the first user and the second user, the second availability being different from the first availability;
responsive to determining that the proximity is not at or within the predetermined first threshold distance or the predetermined second threshold distance, provide, on the virtual position display, an indication of a third availability of one of the first user and the second user, the third availability being different from the first availability and the second availability,
wherein a position of one or more of the plurality of user indicators may be adjusted to adjust the identified first availability;
receive, from a motion sensing device in a location of the first user, first motion information indicating a level of activity of the first user;
receive, from a camera associated with the first user, image information indicating the level of activity of the first user;
receive, from a noise sensing device, audio information indicating the level of activity of the first user, the audio information including an audio signal;
determine whether a conflict exists between the motion information, image information, and audio information;
responsive to determining that the conflict exists, prioritize one of the motion information, image information, and audio information based on a predetermined priority; and
provide, to the plurality of users including the second user via the virtual position display, an indication of the level of activity of the first user based on the predetermined priority of the motion information, image information and audio information.

12. The one or more non-transitory computer-readable media of claim 11, wherein the image from the camera is a near real-time image and wherein the indication of the level of activity of the first user includes a distorted version of the image from the camera.

13. The one or more non-transitory computer-readable media of claim 11,
wherein the audio information indicating the level of activity includes a near real-time audio feed of sound detected by the noise sensing device, the sound detected by the noise sensing device being associated with the first user.

14. The one or more non-transitory computer-readable media of claim 13, wherein the indication of the level of activity of the first user includes a distorted version of the near real-time audio feed of sound detected by the noise sensing device.

* * * * *